United States Patent [19]
Breford

[11] 3,848,894
[45] Nov. 19, 1974

[54] FIFTH WHEEL TRAILER HITCH
[75] Inventor: Glenn H. Breford, Holyrood, Kans.
[73] Assignee: Midway Industries Inc., Holyrood, Kans.
[22] Filed: July 16, 1973
[21] Appl. No.: 379,713

[52] U.S. Cl. .............................................. 280/437
[51] Int. Cl. .............................................. B62d 53/06
[58] Field of Search .......... 280/423, 434, 437, 499, 280/504, 514, 433

[56] References Cited
UNITED STATES PATENTS

| | | |
|---|---|---|
| 3,056,612 | 10/1962 | Slaven .............................. 280/434 |
| 3,194,585 | 7/1965 | Cochrane .......................... 280/437 |
| 3,198,548 | 8/1965 | Lund .............................. 280/433 X |
| 3,318,616 | 5/1967 | Fontaine et al. .................. 280/434 |

*Primary Examiner*—Stanley H. Tollberg
*Attorney, Agent, or Firm*—John H. Widdowson

[57] ABSTRACT

A trailer hitch for the bed of a truck has a frame with spaced upright ends preferably joined by a cross member. Preferably there is a frame mounted in the truck bed which removably engages the upright ends. A cross member is pivotally mounted on the upright frame ends. It has coupler on the upper side to engage a coupler on a trailer.

7 Claims, 11 Drawing Figures

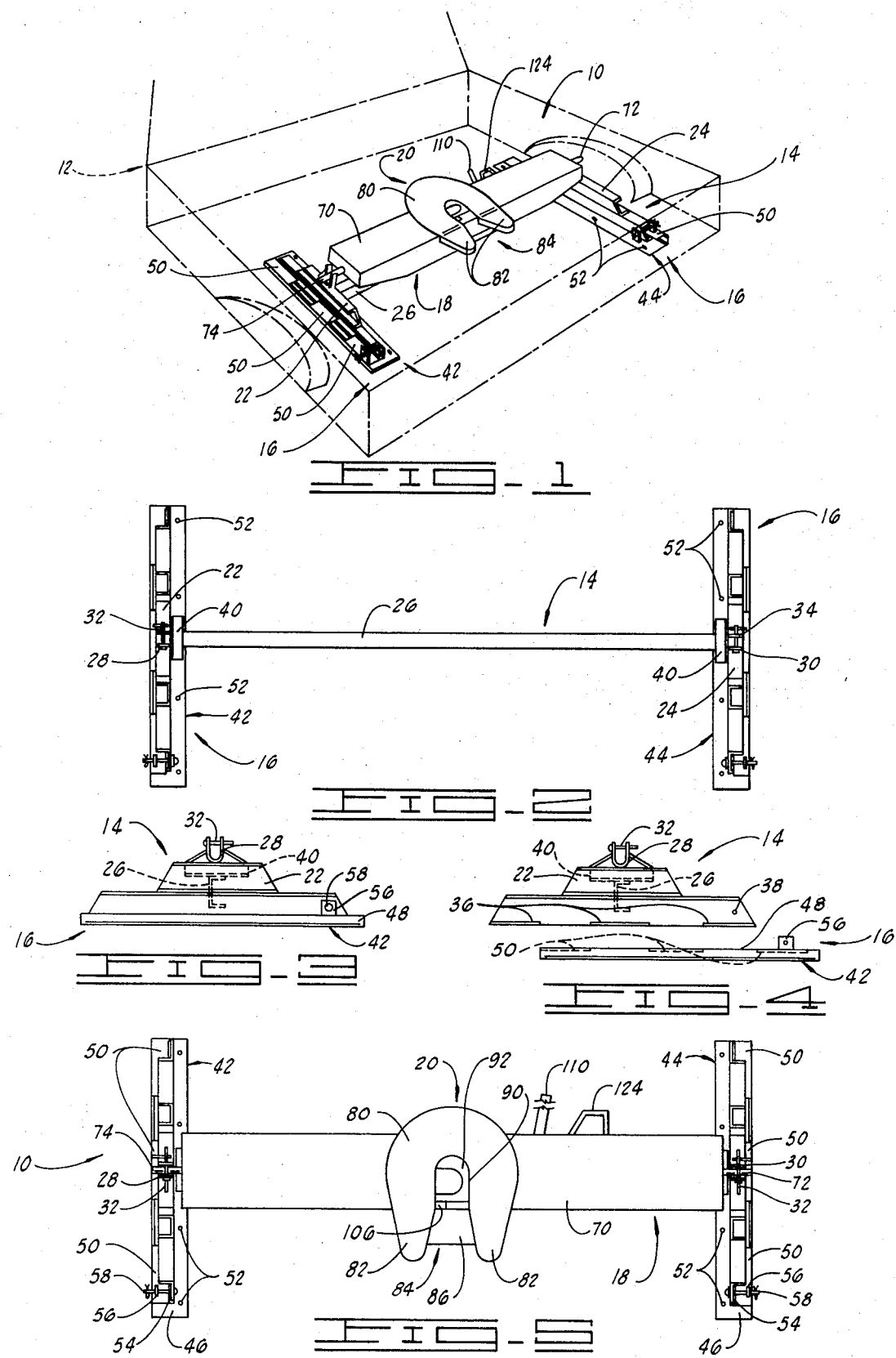

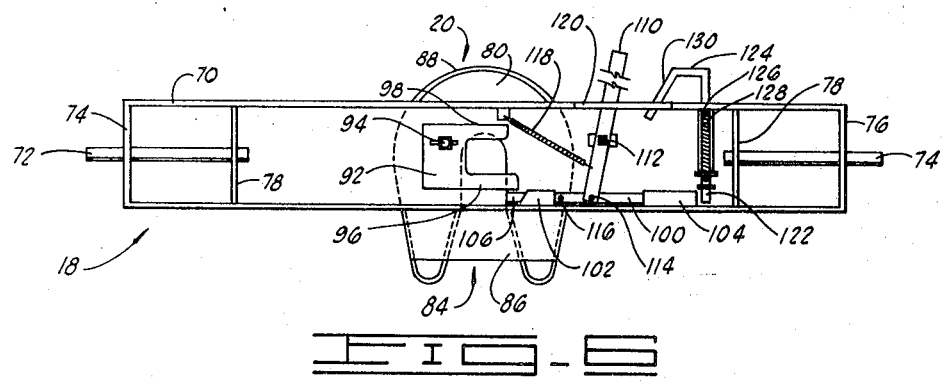
FIG-6
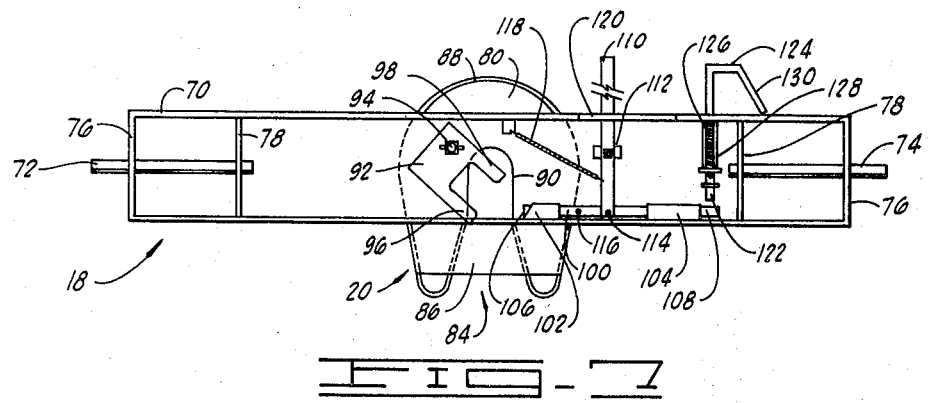
FIG-7
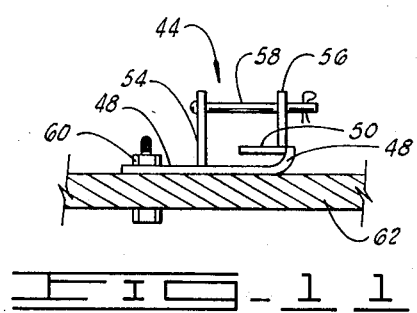
FIG-8
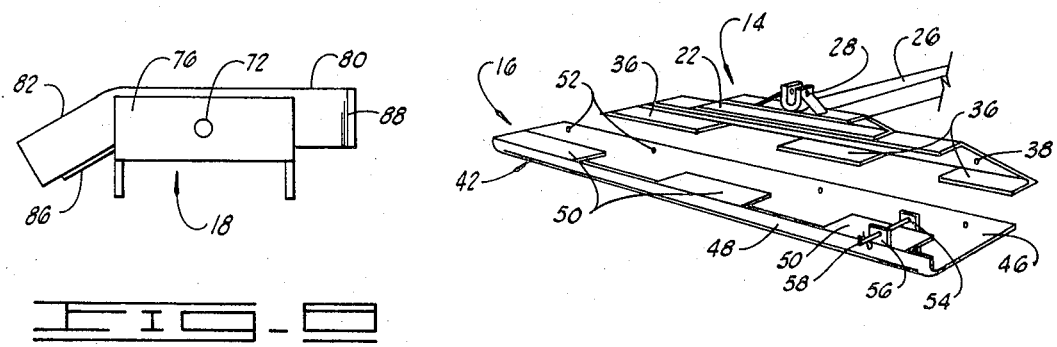
FIG-9
FIG-11
FIG-10
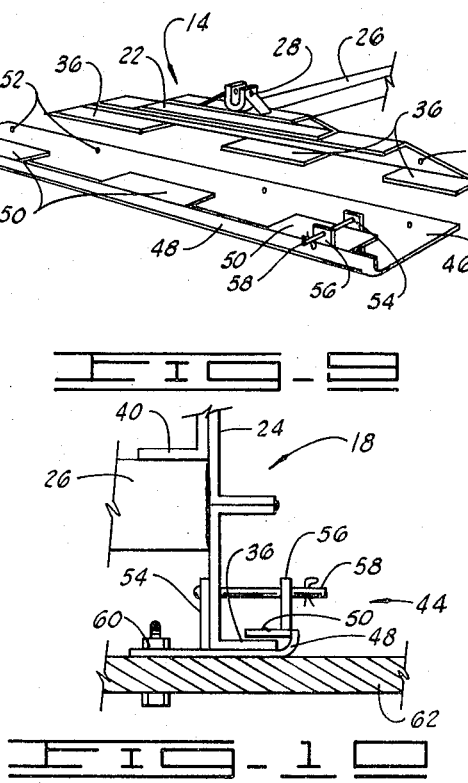

FIFTH WHEEL TRAILER HITCH

BACKGROUND OF THE INVENTION

The invention is related to hitches of the type mounted with the bed of a truck, such as a pickup truck, to pull travel trailers or utility trailers. Numerous types of fifth wheel trailer hitches are known in the prior art which are operable to pull trailers including the type of trailer commonly known as a small utility trailer or a travel trailer or mobile home. Known prior art hitches generally similar to this category of hitch includes rigid upright sides or ends which are secured with the bed of a truck or some portion of the bed or truck chassis and has pivotally mounts therebetween the ends transverse to the truck a pivotable member which is pivotable about its transversely oriented axis. The hitch coupler is attached to the cross member and is constructed to receive therein the pin or ball or the like of the tongue portion of a trailer hitch. The couplers which are known in the prior art which have a single pivotable jaw or slotted member and which have a plurality of pivotable jaws or notched members movable in each case to lock with or clasp the trailer coupler pin or ball. These prior art devices are constructed in each case so as to be permanently mounted with the bed or in the bed of a truck thereby preventing use of the truck for purposes such as load hauling other than pulling a trailer due to the structure permanently mounted in the center portion of the bed. In the case of a pickup truck the load carrying compartment with these prior art trailer hitches is substantially cut in half since the hitch is centrally located and permanently installed.

SUMMARY OF THE INVENTION

In a preferred specific embodiment of this invention, a fifth wheel trailer hitch structure includes a frame having spaced upright ends joined by an elongated cross member, a frame mount to secure the frame upright ends with a truck bed in an opposed relation and a second cross member pivotally mountable with the upper portion of the spaced upright ends and having a coupler secured to the second cross member for cooperatively engaging the coupler of a trailer or the like. The frame mount is secured to the bed of the truck and is designed to removably engage the lower portions of the frame upright ends so as to enable the hitch to be removed from the bed structure of the truck leaving only the mount. The frame with the upright ends is joined by an elongated cross member in a rigid fashion for structural support. The second cross member is pivotally mounted with the upper portion of the upright ends to be in operation positioned transverse to the truck bed. The coupler is provided with a single pivotable jaw or hook-like portion lockable in an engaging relation with the coupling pin of a trailer hitch.

One object of this invention is to provide a fifth wheel trailer hitch structure overcoming the aforementioned disadvantage of the prior art devices.

Still, one other object of this invention is to provide a fifth wheel trailer hitch structure having a frame structure with upright ends joined by a cross member, the ends being mountable with a frame mount on the bed of a truck and further the hitch having an elongated second cross member pivotally mounted with the upright ends and having a trailer hitch type coupler thereon.

Still, another object of this invention is to provide a fifth wheel trailer hitch structure for use with a pickup type truck or the like with the hitch being removably mountable with the bed of the truck via a frame mount secured to the bed and/or chassis of the truck.

Yet, another object of this invention is to provide a fifth wheel trailer hitch structure which is removably mountable with the bed of a truck, which has a coupler secured with a pivotable transverse cross member and which has a single jaw or the like for mounting in a cooperating relation the coupler of a trailer hitch or the like.

Various other objects, advantages, and features of the invention will become apparent to those skilled in the art from the following discussion, taken in conjunction with the accompanying drawings.

DESCRIPTION OF THE DRAWINGS

FIG. 1 is a perspective view taken from the rear and above of the hitch mounted in the rear of a pickup truck between the wheel wells, with only a portion of the pickup shown and such being in dashed lines;

FIG. 2 is a top plan view of the hitch frame structure with the frame mounts attached to the upright ends;

FIG. 3 is an end elevation view of the frame structure shown in FIG. 2;

FIG. 4 is an end elevation view of the end of the frame structure and a mount with same positioned in a spaced relation;

FIG. 5 is a top plan view of the complete hitch structure;

FIG. 6 is a bottom plan view of the cross member having the coupler with the coupler in the locked position;

FIG. 7 is a bottom plan view of the hitch cross member having the coupler with the coupler in the unlocked or open position;

FIG. 8 is an end elevation view of the cross member having the coupler;

FIG. 9 is a perspective view taken from above of an end of the hitch frame and mount therefor with the mount spaced therebelow;

FIG. 10 is an end elevation view of the frame mount and a portion of the frame structure with an end thereof in the mount with the frame mount secured to a supporting member; and FIG. 11 is an end elevation view of the lock end portion of the frame mount with same secured to a support member.

The following is a discussion and description of preferred specific embodiments of the fifth wheel trailer hitch structure of this invention, such being made with reference to the drawings, whereupon the same reference numerals are used to indicate the same or similar parts and/or structure. It is to be understood that such discussion and description is not to unduly limit the scope of the invention.

DESCRIPTION OF PREFERRED EMBODIMENT

Referring to the drawings in detail and in particular to FIG. 1, the trailer hitch structure of this invention is generally indicated at 10 and is shown mounted in the bed of a pickup truck that is partially shown in dashed lines and indicated generally at 12. The fifth wheel trailer hitch structure 10 includes a frame 14 securable by a mount 16 with the bed of the truck 12, a pivotally mounted cross member 18 or second cross member supported on the upper portion of the frame 14, and a coupler 20 on the cross member 18. The fifth wheel trailer hitch 10 is constructed so the frame structure 14 is removably engagable with truck bed mounted mounts 16 that are secured to the truck's structure. The pivotally mounted cross member 18 is supported in a position transverse to the elongated axis of the truck and transverse to the trucks normal direction of forward motion. The coupler 20 connects the hitch 10 with the pivot pin coupler portion of a trailer hitch.

The frame structure 14 is shown in FIGS. 2, 3, 4, 9 and 10 in detail and includes a pair of upright ends 22 and 24 connected by a cross member 26. The cross member 26 is rigidly secured to the ends 22 and 24, such as by welding, to provide a rigid structure with the cross member 26 strengthening the frame structure. The cross member 26 is preferably positioned substantially below the top edges of the upright ends 22 and 24 as shown. Each of the upright ends 22 and 24 has a U-shaped yoke on the upper portion thereof indicated at 28 and 30, respectively. The U-shaped yokes 28 and 30 open upwardly and provide for pivotal mounting of the pivotal cross member 18. Locking pins 32 and 34 are passed through upper portions of the yokes 28 and 30, respectively, to secure the cross member 18. On the bottom portion of the frame upright ends 22 and 24 a plurality of male bracket members 36 extend therefrom as shown clearly in FIGS. 4 and 9. The male bracket members 36 are flanges with a plurality of segments or flange-like segments engagable with female bracket portions of the frame mounts 16. The structure of the frame ends 22 and 24, as shown in the drawings, is formed of a pair of rectangular U-shaped channel members preferably welded together with the open portion thereof on the same side. The male bracket members 36 are portions of the lowermost flange portion of the lower frame end channel member. An aperture 38 is provided in the lower portion of each of the frame ends as illustrated by the frame end 22 shown in FIGS. 4 and 9. The aperture 38 is used by a lock apparatus on the frame mounts 16 to secure the frame ends in position. Structural support braces 40 on the ends of the cross member 26 provide strengthening of same in its rigid relation with the frame ends 22 and 24.

The frame mount or truck bed mounted mount 16 includes a pair of mount structures, one for each of the frame ends 22 and 24. The mount structures are shown in detail in FIGS. 3, 4, 9, 10 and 11. The mount 16 includes a pair of mirror-image mount structures indicated individually at 42 and 44 engagable with the frame ends 22 and 24, respectively. Inasmuch as the mounts 42 and 44 are substantially the same, except for the mirror-image construction, similar parts thereof are given the same numerals for identification purposes. FIGS. 9, 10 and 11 show in detail the mounts 42 and 44. Referring to FIG. 9 the mount 42 has a bottom plate member 46 with an upturned edge portion 48 on what is normally the outside portion of a mount. A plurality of plates 50 extend inwardly from the top portion of the upturned edge portion 48 forming female bracket portions of the mount to be engaged with the male bracket portions of the frame end 22. A plurality of holes 52 in thhe inner edge portion of the mount bottom plate 46 are used to secure the mount to the truck bed or a supporting structure. The frame end lock is shown in detail in FIGS. 9, 10 and 11 and includes an inner member 54 extending upwardly from the mount bottom plate 46 and an outer member 56 extending upward from the upright edge portion 48. The upright portions are provided with apertures therethrough to receive a locking pin 58. FIG. 11 shows the lock end portion of the mount 44 attached by a bolt 60 to a supporting member 62. FIG. 10 shows the mount 44 with the frame end 24 mounted therein and the lock in the locked position with the male bracket member of the frame end 24 engaged with the female bracket portion of the mount 44 and the locking pin 58 extended through the supports 54 and 56 and the frame end 24. FIGS. 1, 2 and 3 show the frame 14 in the engaged or mounted relation with the frame mounts 16. In mounting the frame structure 14 with the frame mount 16, the frame ends 22 and 24 can be set down over the mounts 42 and 44, respectively, with the male and female portions in a spaced relation then sliding the frame forward or aft to position the lock portion of the mount with the appropriate portion of the frame ends as shown. Since locks are provided on each of the mounts 16 both of the frame ends 22 and 24 can be secured to the mount 16. The staggered or spaced relation of the flanges 36 and 50 provides for only a slight sliding movement of the frame 14 relative to the mount 16 being required to secure same in the locked position as is illustrated in FIGS. 1, 2 and 5.

FIGS. 5, 6, 7 and 8 show in detail the upper cross member 18 or pivotable cross member and coupler 20. The second cross member 18 is pivotally mounted with the upper portion of the frame ends 22 and 24 and the coupler 20 is centrally positioned on the cross member 18 as shown. The cross member 18 includes an elongated rectangular box-like structure, preferably constructed as shown, open on the bottom side thereof, and designed to support a pair of pivot pins or shafts 72 and 74 in an in-line relation extending oppositely from the ends 76 of the cross member. Support members 78 on the interior of the cross member are attached to the inner ends of the pins or shafts 72 and 74 providing structural support for the shafts or pins. Preferably the shafts 72 and 74 are secured to the cross member ends 76 and cross member internal support members 78. The shafts 72 and 74 are preferably secured to the cross member 18 by any suitable means such as welding. When the cross member 18 is in a mounted relation with the frame structure 14 the pins or shafts 72 and 74 are supported in the yokes 30 and 28, respectively, as shown in FIG. 5. The coupler 20 includes a plate-like body member 80 and preferably constructed in a generally annular shape as shown, having a flat portion above the cross member 18 and a ramp portion 82 on the normally rear side thereof. An entrance slot generally indicated at 84 is provided an opening on what is the normally rear side of the cross member for easy and convenient mounting of the trailer hitch coupling pin. The entrance slot 84 has a plate member 86 connecting the bottom of the ramp portion 82. A downwardly extending skirt 88 extends around the exposed portions of the plate body member 80 strengthening same. The entrance slot 84 is formed in the plate body member 80 and upper portion of the cross member box structure 70 has a U-shaped inner end portion indicated at 90 in which the coupling pin rests. The coupler 20 has a U-shaped jaw member 92 pivotally mounted at 94 with the cross member box structure 70. The rearwardmost portion of the jaw 92 has an extended portion or finger indicated at 96 and a forward extended portion 98 as shown in FIGS. 6 and 7. The rear extended portion 96 is longer than the forward extended portion 98. The jaw 92 is freely pivotable between the positions shown in FIGS. 6 and 7. The coupler jaw 92 is in an open position in FIG. 7 to receive or release a trailer hitch pin and it is in a locked position in FIG. 6.

A pair of cooperating locking bolts secure the jaw 92 in the locked position. The first or main locking bolt has a slidable member 100 supported by mounts 102 and 104 with the cross member box structure 70. One end 106 of the locking bolt 100 is positionable between the longer jaw portion 96 and the interior of the cross member structure 70 as shown in FIG. 6. The opposite end of the locking bolt 100 is indicated at 108 and such is contacted by the second locking bolt for retaining the first locking bolt in the locked position. The first locking bolt has a locking bolt moving lever 110 supported at a pivotal mount 112 with the cross member box structure 70 and pivotally attached at the opposite end 114 to the locking bolt 100. Pivotal connection between the bolt moving arm 110 and the locking bolt 100 are constructed and sized such that pivoting motion of the arm 110 about the pivot 112 will slide the locking bolt 100 in the mounts 102 an 104. A stop member 116 is provided on the bolt 100 to limit the movement of the locking bolt 100 in the direction of the jaw 92. A spring 118 connected between a lug on the interior of the cross member structure 70 and the locking bolt moving lever 110 as shown provides a pulling force to pull the bolt 100 into a normally extended position. The bolt moving lever handle 110 moves in a slot 120 in the normally forward side of the cross member structure 70. The second locking bolt includes a bolt or shank 122 with a handle 124 on one end thereof shaped as shown in FIG. 6, a spring 126 urging the bolt to an extended position and a supporting sleeve 128 around the spring 126 to position and support the bolt or shank 122. The spring 126 is in compression between the interior of the cross member box structure 70 and an extended portion on the end portion of the bolt 122 to force the bolt into an extended position. With the bolt in the position shown in FIG. 6 the first locking bolt is prevented from moving. The bolt handle 124 is preferably constructed and shaped as shown in detail in FIGS. 6 and 7 so that in the locked position an extended portion 130 of the bolt handle 124 can be inserted into the slot 120 to prevent rotation of the bolt 122 and place the handle 124 in a position where there is less likelihood for it to be accidentally moved to a retracted position. Before the first locking bolt 100 can be put in the retracted position, the second bolt 122 must be withdrawn to the position shown in FIG. 7 so the first locking bolt 100 can be slid from the position shown in FIG. 6. In use the coupler 20 is positioned as shown in FIG. 7 prior to the receiving of the coupling pin of a trailer or the like. Once the truck is backed into position and the coupling pin passes into the entrance slot 84, the jaw 92 is pivoted to the position shown in FIG. 6 and at such time the first locking bolt 100 can be moved into the position shown and the second locking bolt 122 can be moved to the position shown to secure the first locking bolt 100. When the trailer hitch 10 is connected with the trailer the cross member 18 will pivot on the pins 72 and 74 in their yoke like supports on the frame structure 14 to provide for vertical angular differential movement between the truck or towing vehicle and the trailer.

Installation of the fifth wheel hitch 10 of this invention is accomplished by securing the mounts 42 and 44 in the bed of a truck such as the pickup truck 12 shown in FIG. 1 or on the bed of another suitable truck, towing vehicle or the like. The mounts 42 and 44 are preferably secured to the chassis of the vehicle for strength and safety reasons. The plurality of holes 52 in the mounts 42 and 44 are provided for securing the frame mounts to a truck. The frame structure 14 is securely attached to the mount 16 as described by engaging the male and female bracket members and securing the frame with the locking pins 58. The second cross member or upper cross member 18 is attached to the frame with its pins 72 and 74 supported in the U-shaped yokes or fixtures 28 and 30 of the frame upright ends 22 and 24. The preferred installed position of the fifth wheel trailer hitch 10 of this invention in a pickup truck is shown in FIG. 1 and has the pivotal cross member 18 having the hitch coupler positioned at a height substantially below the upper edges of the side walls of the bed and below the top of the wheel wells.

When the coupler 20 is set in the open position, as shown in FIG. 7, the trailer hitch 10 is ready to receive the locking pin or coupling pin of a trailer hitch in the entrance slot 84. The plate portion of the coupler 20 in particular the ramp and entrance slot plate 86 provide a runway for the trailer hitch coupling pin to move into and through the entrance slot 84. Once a trailer hitch coupling pin is engaged in the fifth wheel hitch 10, the jaw 92 and locking bolts are set in the position shown in FIGS. 5 and 6 and the hitch is ready for towing.

In the manufacture of the fifth wheel trailer hitch 10 of this invention, it is obvious that same can be easily constructed to achieve the end product. The structural features of the hitch 10 are relatively simple and pose no particular manufacturing problem. The construction of the male bracket members and female bracket members of the upright ends of the frame 14 and the mount 16 are necessarily constructed with relatively close tolerances to ensure a minimum of vibration during use of the hitch 10.

In the use and operation of the fifth wheel trailer hitch of this invention it is seen that same provides a fifth wheel type trailer hitch usable with a popular style of utility trailers and travel trailers which utilize the fifth wheel type of hitch to couple the trailer with a towing vehicle. The trailer hitch structure 10 of this invention has a mount which remains in a secured position with the truck bed or the like in a removable frame structure which can be removed so the truck bed may be used for cargo carrying when thhe hitch 10 is not needed. The structure of the hitch frame and the mount is such that the frame structure can be easily removed from the mount with the truck bed.

As will become apparent from the foregoing description of the applicant's fifth wheel trailer hitch structure, relatively simple means has been provided to give a removable feature to a fifth wheel trailer hitch of the type which is normally mounted with a truck bed. The trailer hitch structure is economical to produce in that its structure is simple and can be easily manufactured. The hitch structure is simple to use in that it has a minimum of moving parts and it is easily removable from the mount to give additional use of a truck on which the hitch is mounted. The removable feature of the hitch structure enables the truck on which it is mounted to be used for towing when the hitch is mounted and for cargo carrying when the hitch frame is removed, thus it is not restricted by having a permanently mounted fifth wheel hitch in the center portion of the cargo body.

While the invention has been described in conjunction with preferred specific embodiments thereof, it will be understood that this description is intended to illustrate and not to limit the scope of the invention, which is defined by the following claims.

I claim:

1. A trailer hitch mountable in the bed of a truck on the bottom thereof, comprising:
   a. a frame having spaced upright end portions, said upright end portions each having in the upper portion thereof means to pivotally receive and mount a shaft,
   b. a cross member attached to said end portions substantially below the top edge thereof and joining said end portions,
   c. a second cross member, said second cross member having shaft mounting means in the end portions thereof, the shafts thereof being pivotally and oppositely mountable in the mounting means in the upper portions of said upright end portions of said frame,
   d. coupling means mounted on the upper side of said second cross member and constructed and adapted to receive and mount in towing relation cooperating coupling means on a trailer or thhe like, and
   e. said coupling means has a entrance slot in said second cross member, a jaw member movably mounted with said second cross member, a locking bolt slidably mounted to secure said jaw member in an operating position and a second locking bolt slidably mounted to in use secure said first named locking bolt when said first named locking bolt is securing said jaw member.

2. The hitch of claim 1, wherein:
   a. said upright ends are rigidly secured to said first named cross member, and
   b. said means to pivotally receive and mount a shaft is a yoke like bracket having a locking pin to retain said shaft therein.

3. The hitch of claim 2, wherein:
   a. said shaft mounting means has second cross member end members and second cross member internal support members at opposite end portions of said second cross member, said end members and said internal support members being rigidly secured to said shafts, an
   b. said shafts extend oppositely from said second cross member.

4. The hitch of claim 3, wherein:
   a. said jaw member is pivotally mounted on the under side of said cross member, said jaw member being pivotable between a first position with said slot being generally transverse to said entrance slot and in a second position with said slot therein opening into said entrance slot in the same general direction as said entrance slot,
   b. said first named locking bolt being slidable to an extended position having one end thereof contacting said jaw member to prevent rotation thereof, and
   c. said first named cross member is spaced substantially below said second cross member such that in normal pivotal movement said second cross member will not contact said first named cross member.

5. The hitch of claim 4, wherein:
   a. said second locking bolt being engagable with an end portion of said first named locking bolt opposite said first named end thereof to secure said first named locking bolt in said extended position,
   b. said entrance slot is a generally U-shaped slot opening rearward, and
   c. said slot in said jaw member is a generally U-shaped slot.

6. A trailer hitch mountable in the bed of a truck on the bottom thereof, comprising:
   a. a frame having spaced upright end portions, each of said end portions having means in the upper portion thereof to receive and pivotally mount a shaft, and means in the lower portions to removably mount said upright end portions on cooperating truck bed mounted mounting means,
   b. truck bed mountable mounting means having means to mount same in the bed of a truck to provide in spaced relation mounting means to removably receive and mount said mounting means on the lower portions of said upright end portions of said frame,
   c. said means to mount said upright ends has a generally horizontally disposed flange-like male bracket portion extending from a lower portion of each said upright end portions,
   d. said truck bed mounted mounting means has a generally horizontally disposed cross-sectionally U-shaped female bracket portion securable to said truck bed having open ends to receive therein said flange-like male bracket portion, and means to lock said male bracket portion and said female bracket portion in a rigid relation,
   e. a cross member attached to said end portions substantially below the top edge thereof and joining said end portions,
   f. a second cross member, said second cross member having shaft mounting means in the end portions thereof, the shafts thereof being pivotally and oppositely mountable in the mounting means in the upper portions in said upright end portions of said frame, and
   g. coupling means mounted on the upper side of said second cross member and constructed and adapted to receive and mount in towing relation cooperating coupling means on a trailer or the like.

7. The hitch of claim 6, wherein:
   a. said truck bed mounted mounting means has a plurality of said female bracket portions,
   b. said means to lock has a locking pin support portion with a pair of apertures secured to said female bracket portion, an aperture through said male bracket portion and a locking pin member insertable through said aperture in said female bracket member and said male bracket member, and
   c. said truck bed mounted mounting means and said means to mount said upright ends has said female bracket portion and said male bracket portion constructed in a mirror image relation.

* * * * *